(12) United States Patent
Kotera et al.

(10) Patent No.: US 8,268,900 B2
(45) Date of Patent: Sep. 18, 2012

(54) ELECTROLYTE MEMBRANE, PROCESS FOR ITS PRODUCTION AND MEMBRANE-ELECTRODE ASSEMBLY FOR POLYMER ELECTROLYTE FUEL CELLS

(75) Inventors: Seigo Kotera, Yokohama (JP); Hirokazu Wakabayashi, Yokohama (JP); Shinji Kinoshita, Yokohama (JP); Hiroshi Shimoda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/431,445

(22) Filed: Apr. 28, 2009

(65) Prior Publication Data

US 2009/0214924 A1 Aug. 27, 2009

Related U.S. Application Data

(62) Division of application No. 11/312,342, filed on Dec. 21, 2005, now Pat. No. 7,569,616.

(30) Foreign Application Priority Data

Dec. 22, 2004 (JP) .................................. 2004-371367
Jun. 10, 2005 (JP) .................................. 2005-170890

(51) Int. Cl.
*B01J 49/00* (2006.01)
(52) U.S. Cl. ............ 521/27; 264/176.1; 429/30; 429/33; 429/40
(58) Field of Classification Search .................... 521/27; 264/176.1; 429/30, 33, 40
See application file for complete search history.

(56) References Cited

U.S. PATENT DOCUMENTS

| 5,098,636 A | 3/1992 | Balk |
| 5,264,100 A | 11/1993 | Shimohira et al. |
| 5,429,848 A * | 7/1995 | Ando et al. .................. 428/36.2 |
| 5,965,294 A * | 10/1999 | Hamada et al. ............ 429/218.2 |
| 6,316,088 B1 | 11/2001 | Ogawa et al. |
| 6,322,604 B1 * | 11/2001 | Midkiff .......................... 55/486 |
| 6,638,659 B1 * | 10/2003 | Fenton et al. ................. 429/535 |

(Continued)

FOREIGN PATENT DOCUMENTS

JP 5-75835 10/1993

(Continued)

OTHER PUBLICATIONS

Derwent Publications, AN 1994-305953, XP-002380281, JP 06-231779, Aug. 19, 1994.

(Continued)

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

Provided is an electrolyte membrane containing: a reinforced inner layer; and an unreinforced outer layer on one or each side of the reinforced inner layer, wherein the reinforced inner layer includes an inner ion exchange resin reinforced with a non-woven fabric composed of a melt moldable fluororesin in the form of a continuous fiber, wherein a number of intersecting points of the continuous fiber are fused and/or bonded, and wherein the unreinforced outer layer includes an outer ion exchange resin, which may be the same as or different from the inner ion exchange resin. Also provided is a membrane electrode assembly for a polymer electrolyte fuel cell, wherein the membrane electrode assembly contains the above-mentioned polymer electrolyte membrane.

25 Claims, 1 Drawing Sheet

U.S. PATENT DOCUMENTS

| | | | |
|---|---|---|---|
| 6,692,858 B2 | 2/2004 | Higuchi et al. | |
| 6,797,316 B2 | 9/2004 | Kinoshita et al. | |
| 7,622,215 B2 * | 11/2009 | Hori et al. | 429/513 |
| 2003/0008198 A1 * | 1/2003 | Mukoyama et al. | 429/42 |
| 2004/0198127 A1 * | 10/2004 | Yamamoto et al. | 442/408 |
| 2005/0186461 A1 | 8/2005 | Hommura et al. | |
| 2005/0214611 A1 | 9/2005 | Hommura | |

FOREIGN PATENT DOCUMENTS

| | | |
|---|---|---|
| JP | 6-231779 | 8/1994 |
| JP | 7-68377 | 7/1995 |
| JP | 2003-297394 | 10/2003 |
| WO | 2004/011535 A1 | 2/2004 |

OTHER PUBLICATIONS

Patent Abstract Japan, JP 06-231780, Aug. 19, 1994.
Patent Abstract Japan, JP 2003-297394, Oct. 17, 2003.
Patent Abstract of Japan, 2000-234031, Aug. 29, 2000.
Patent Abstracts of Japan, JP 62-131038, Jun. 13, 1987.
U.S. Appl. No. 12/408,191, filed Mar. 20, 2009, Kotera, et al.
U.S. Appl. No. 13/194,241, filed Jul. 29, 2011, Terada, et al.

* cited by examiner

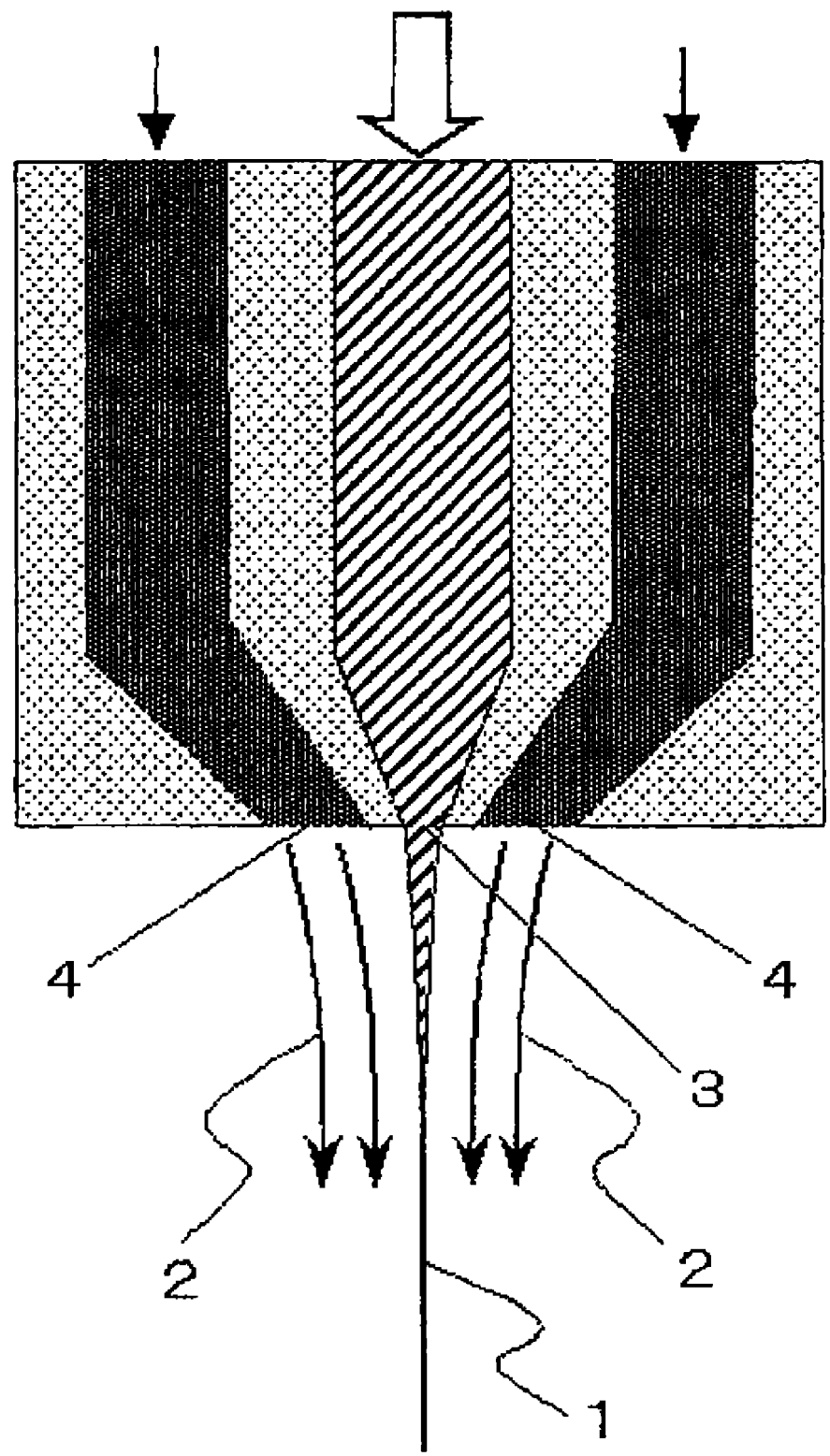

ELECTROLYTE MEMBRANE, PROCESS FOR ITS PRODUCTION AND MEMBRANE-ELECTRODE ASSEMBLY FOR POLYMER ELECTROLYTE FUEL CELLS

CROSS-REFERENCE TO RELATED APPLICATIONS

The present application is a divisional of U.S. patent application Ser. No. 11/312,342, filed on Dec. 21, 2005, now U.S. Pat. No. 7,569,616, which claims priority to Japanese patent applications JP 2005-170890, filed on Jun. 10, 2005, and JP 2004-371367, filed on Dec. 22, 2004.

FIELD OF THE INVENTION

The present invention relates to an electrolyte membrane reinforced with a non-woven fabric, a process for its production and a membrane-electrode assembly for polymer electrolyte fuel cells, having the electrolyte membrane.

DISCUSSION OF THE BACKGROUND

In recent years, researches have been in progress for polymer electrolyte fuel cells employing a proton-conductive polymer membrane as an electrolyte. Such polymer electrolyte fuel cells have characteristics such that they are operable at a low temperature, provide a high output density and can be small-sized, and thus, they are expected to be prospective in their use as e.g. power sources for vehicles.

As an electrolyte membrane for polymer electrolyte fuel cells, a proton conductive ion exchange membrane having a thickness of from 20 to 200 μm is commonly used. Particularly, a cation exchange membrane made of a perfluorocarbon polymer having sulfonic groups (hereinafter referred to as a sulfonic perfluorocarbon polymer) is excellent in basic properties and thus is widely studied.

As a method for reducing the electric resistance of such a cation exchange membrane, the sulfonic group concentration may be increased, or the membrane thickness may be reduced. However, if the sulfonic group concentration is substantially increased, the mechanical strength of the membrane tends to decrease, or the membrane tends to be susceptible to creeping during the operation of the fuel cell for a long period of time, thus leading to a problem such as a decrease in the durability of the fuel cell. On the other hand, if the membrane thickness is reduced, there will be a problem such that the mechanical strength of the membrane tends to be low, and in a case where a membrane-electrode assembly is to be prepared by bonding the membrane to a gas diffusion electrode, such processing tends to be difficult or the handling efficiency tends to be poor.

Further, upon absorption of water, the electrolyte membrane tends to have the size increased in the longitudinal direction of the membrane, whereby various problems are likely to be brought about. For example, when a membrane-electrode assembly is assembled in a fuel cell, which is then operated, the membrane will be swelled by water formed by the reaction or by steam, etc. supplied together with the fuel gas, whereby the size of the membrane will be increased. As the membrane and the electrode are bonded, the electrode usually follows the dimensional change of the membrane. The membrane-electrode assembly is usually restricted by a separator or the like, having grooves formed as flow channels for a gas, whereby the increase in the dimension of the membrane creates "wrinkles". And, such wrinkles will fill in the grooves of the separator to hinder the gas flow.

As a method to solve such a problem, a method has been proposed wherein a porous media made of polytetrafluoroethylene (hereinafter referred to as PTFE) is impregnated with a sulfonic perfluorocarbon polymer (Patent Document 1). However, the porous media of PTFE is relatively soft due to the material, whereby the reinforcing effect is inadequate, and the above problem has not yet been solved. Further, a method of filling an ion exchange resin to a porous media made of a polyolefin, has also been proposed (Patent Document 2), but the chemical durability was inadequate, and there was a problem in the stability for a long period of time.

Further, as another reinforcing method, a method of employing fluororesin fiber has been proposed. There is a method for producing a cation exchange membrane reinforced with a reinforcing material of a fibril-form fluorocarbon polymer (Patent Document 3) or a method for preparing a polymer membrane reinforced by short fibers of a fluororesin (Patent Document 4). In these final products, the reinforcing materials themselves were not particularly positively entangled or bonded, whereby the reinforcing efficiency was poor, and it was necessary to incorporate a relatively large amount of such reinforcing materials. In such a case, processing to thin film tends to be difficult, and an increase in the membrane resistance was likely to be brought about.

Further, Patent Document 5 proposes an electrolyte membrane for polymer electrolyte fuel cells, reinforced by a fluorinated fiber sheet wherein fluorofibers being non-continuous short fibers having a length of at most 15 mm are bonded to one another by a binder such as viscose, carboxymethylcellulose or polyvinyl alcohol. Such a binder is an impurity for the electrolyte membrane for fuel cells, and the remaining binder substantially impairs the durability of the fuel cells. Further, in the proposal, fibers having a relatively large fiber diameter i.e. a fiber diameter of 15 μm, are employed, and in order to realize sufficient bonding of the fibers to one another, the reinforcing media is required to have a thickness of few times the fiber diameter, whereby it is considered that an increase in the membrane resistance could easily be brought about. Further, in the method of processing the non-continuous short fibers by a method such as a paper making method, there will be a problem in making the membrane to be thin, such that with extremely thin fibers, handling is practically difficult.

Patent Document 1: JP-B-5-75835 (claims)
Patent Document 2: JP-B-7-68377 (claims)
Patent Document 3: JP-A-6-231779 (claims)
Patent Document 4: WO04/011535 (claims)
Patent Document 5: JP-A-2003-297394 (claims, paragraphs 0012 and 0026)

SUMMARY OF THE INVENTION

Under these circumstances, it is an object of the present invention to provide an electrolyte membrane which has high strength even if the thickness is thin, is excellent in the dimensional stability upon absorption of water and has a low electric resistance. Further, it is an object of the present invention to provide a membrane-electrode assembly for polymer electrolyte fuel cells, which is excellent in durability and has a high output, as it has such an electrolyte membrane.

The present invention provides an electrolyte membrane which is made mainly of an ion exchange resin and reinforced with a non-woven fabric made of continuous fiber of a fluororesin wherein at least some of intersecting points of the continuous fiber are fixed, and which has, as the outermost layer on one side or each side, a layer not reinforced, made of an ion exchange resin which may be the same as or different from the above ion exchange resin.

The non-woven fabric in the present invention is made of continuous fiber, whereby sufficient entanglement of the fiber itself is formed, and the number of fiber ends which may form dynamic defects is very small. Further, at least some of intersecting points of the continuous fiber are fixed, whereby the elastic modulus is high. Thus, the electrolyte membrane reinforced by such a non-woven fabric is excellent in the mechanical strength.

The electrolyte membrane of the present invention has, as the outermost layer on one side or each side, a layer not reinforced, made of an ion exchange resin which may be the same as or different from the above ion exchange resin. By such a layer, it is possible to reduce the electrical resistance at the bonding portion of the electrolyte membrane and the electrode when the electrolyte membrane of the present invention is used as a polymer electrolyte membrane for a polymer electrolyte fuel cell.

Further, the present invention provides a process for producing an electrolyte membrane, which is a process for producing the above electrolyte membrane and which comprises dispensing a melt-moldable fluororesin in a molten state from a spinning nozzle, stretching and spinning it by a gas discharged from a gas discharge nozzle disposed in the vicinity of the spinning nozzle, to obtain continuous fiber, and forming the continuous fiber into a non-woven fabric.

By the process of the present invention, the fiber constituting the non-woven fabric can be made very slender, and an increase in the electrical resistance of the electrolyte membrane by the reinforcement can be suppressed, whereby it is possible to form a non-woven fabric most suitable as a reinforcing material for an electrolyte membrane for fuel cells.

It is preferred that the continuous fiber is collected to form a non-woven fabric on an air-suction surface, followed by hot pressing or applying a solution containing a binder made of a solvent-soluble fluoropolymer, to bond intersecting points of the continuous fiber.

Further, the present invention provides a membrane-electrode assembly for polymer electrolyte fuel cells, which comprises a cathode and an anode, each having a catalyst layer comprising a catalyst and an ion exchange resin, and a polymer electrolyte membrane interposed between the cathode and the anode, wherein the polymer electrolyte membrane is made of the above electrolyte membrane.

The electrolyte membrane of the present invention is reinforced with a non-woven fabric made of continuous fiber of a fluororesin, whereby an increase in the electrical resistance due to the reinforcement is little, and it has sufficiently high strength even if the membrane thickness is thin. Further, it is excellent in the dimensional stability upon absorption of water, and a polymer electrolyte fuel cell having such an electrolyte membrane provides a constant high output even when operated for a long period of time.

BRIEF DESCRIPTION OF THE FIGURES

In the accompanying drawing, FIG. 1 is a cross-sectional view showing one form in cross section of a nozzle to be used in an apparatus for producing a melt blown non-woven fabric.

In the FIGURE, reference numeral 1 indicates a fluororesin, 2 a gas, 3 an outlet of a spinning nozzle, and 4 an outlet of a gas discharge nozzle.

DETAILED DESCRIPTION OF THE INVENTION

The non-woven fabric in the present invention is made of continuous fiber of a fluororesin. In the present invention, continuous fiber means a fiber having an aspect ratio of at least 10,000. The fiber length is preferably at least 20 mm.

The fiber diameter of the continuous fiber is preferably from 0.01 to 13 μm. As the fiber diameter of the continuous fiber is slender, the proton transfer may be carried out more smoothly, whereby an increase in the electrical resistance due to the reinforcement can be suppressed. Further, if the fiber diameter is small, it is possible to increase the number of intersecting points of the fiber in the same film thickness, whereby the strength of non-woven fabric can be increased, and the dimensional stability of the electrolyte membrane can be improved. On the other hand, if the fiber diameter is too small, the tensile strength per fiber tends to be weak, and it tends to be difficult to practically use it from the viewpoint of the handling efficiency. The fiber diameter is more preferably from 0.01 to 5 μm, particularly preferably from 0.01 to 3 μm.

In the present invention, the fluororesin constituting the non-woven fabric is preferably a homopolymer or a copolymer containing at least one type of monomer units based on monomers, such as a perfluoroolefin such as tetrafluoroethylene or hexafluoropropylene, chlorotrifluoroethylene or a perfluoro(alkyl vinyl ether).

Specifically, it may, for example, be a tetrafluoroethylene/perfluoro(alkyl vinyl ether) copolymer (PFA), an ethylene/tetrafluoroethylene copolymer (ETFE), a tetrafluoroethylene/hexafluoropropylene copolymer (FEP), a polychlorotrifluoroethylene (PCTFE), an ethylene/chlorotrifluoroethylene copolymer (ECTFE), a polyvinylidene fluoride polymer (PVdF) or a polyvinyl fluoride polymer (PVF), a copolymer comprising a plurality of monomer units constituting these polymers, or a blend of these polymers.

Among these fluororesins, a melt moldable fluororesin such as ETFE, PFA, FEP or PVDF, is preferred, and PFA and ETFE are particularly excellent in the mechanical strength and moldability and thus preferred. As ETFE, the molar ratio of monomer units based on tetrafluoroethylene (hereinafter referred to as TFE)/monomer units based on ethylene, is preferably from 70/30 to 30/70, more preferably from 65/35 to 40/60.

The above-mentioned ETFE, PFA, FEP or PVDF may contain a small amount of monomer units based on a comonomer. Such a comonomer may, for example, be an olefin excluding ethylene, such as a fluoroethylene such as $CF_2=CFCl$; a fluoropropylene $CF_2=CFCF_3$ or $CF_2=CHCF_3$, a fluoroethylene having a $C_{2-12}$ perfluoroalkyl group such as $CF_3CF_2CF_2CF_2CH=CH_2$ or $CF_3CF_2CF_2CF_2CF=CH_2$; a perfluorovinyl ether such as $R^f(OCFXCF_2)_kOCF=CF_2$ (wherein $R^f$ is a $C_{1-6}$ perfluoroalkyl group, X is a fluorine atom or a trifluoromethyl group, and k is an integer of from 0 to 5); a perfluorovinyl ether having a group readily convertible to a carboxylic group or a sulfonic group, such as $CH_3OC(=O)CF_2CF_2CF_2OCF=CF_2$, or $FSO_2CF_2CF_2OCF(CF_3)CF_2OCF=CF_2$; a $C_3$ olefin such as propylene; or a $C_4$ olefin such as butylene or isobutylene. As a comonomer for ETFE, $CF_3CF_2CF_2CF_2CH=CH_2$ is particularly preferred, and as a comonomer for PFA, $CF_3CF_2OCF=CF_2$, $CF_3CF_2CF_2OCF=CF_2$ or $CF_3CF_2CF_2OCF(CF_3)CF_2OCF=CF_2$ is particularly preferred.

In a case where monomer units based on the above comonomer are contained, their content is usually preferably at most 30 mol %, more preferably from 0.1 to 15 mol %, further preferably from 0.2 to 10 mol %, based on the total of monomer units for ETFE, PFA, FEP or PVDF.

With respect to the melt flow rate (MFR) of the melt moldable fluororesin, in the case of PFA, MFR according to ASTM D3307 is preferably from 40 to 300 g/10 min. In a case where very fine fiber is to be formed, the productivity will be improved as the pressure loss of the spinning die is low, and accordingly, it is more preferably at least 60 g/10 min. Further, if MFR is large, the strength of the obtainable fiber tends to be low, and it is more preferably at most 150 g/10 min. In the case of ETFE, MFR according to ASTM D3159 is preferably at least 40 g/10 min.

To the non-woven fabric in the present invention, it is preferred to apply at least one type of treatment selected from the group consisting of radiation treatment, plasma treatment and chemical treatment with metallic sodium. By such treatment, polar groups such as —COOH groups, —OH groups or —COF groups are introduced to the fiber surface, whereby the adhesion at the interface between the ion exchange resin as the matrix and the non-woven fabric as a reinforcing material can be increased, and consequently, the reinforcing effect can be increased.

It is preferred to employ a melt blown method as a method for producing the non-woven fabric in a case where the fluororesin is a melt moldable fluororesin such as PFA or ETFE. As compared with another method for preparing non-woven fabrics wherein fiber is formed from the resin and then it is formed into a non-woven fabric, the melt blown method has high productivity, since formation of the fiber and formation of the fabric can be carried out substantially simultaneously. Further, the fiber constituting the non-woven fabric can be made very slender, and an increase in the electric resistance of the electrolyte membrane by the reinforcement can be suppressed, whereby it is possible to form a non-woven fabric most suitable as a reinforcing material for an electrolyte membrane for fuel cells.

FIG. 1 is a cross-sectional view showing one form in cross section of a nozzle to be used in an apparatus for producing a non-woven fabric by a melt blown method. In the melt blown method, the melt moldable fluororesin 1 is dispensed from an outlet 3 of a spinning nozzle in a molten state, and stretched and spun by a gas 2 discharged from an outlet 4 of a gas discharge nozzle disposed in the vicinity of the spinning nozzle, whereby continuous fiber can be obtained. Such continuous fiber is collected on an air-suction surface, whereby a non-woven fabric can be formed.

Air-suction surface means, for example, an apparatus capable of forming the dispensed very fine fiber into a fabric form by sucking air through one side of a film substrate in a reduced pressure state. The film substrate having an air permeability is not particularly limited, but it may, for example, be a mesh, a cloth or a porous media, and the material is also not particularly limited, but in the case of forming a non-woven fabric of a fluororesin, a mesh made of a metal is preferred since the melting temperature is high.

With respect to the air-suction function, it is desired to have a sucking ability to sufficiently suck and maintain the spun continuous fiber in the form of a fabric. Accordingly, the air-suction surface preferably has a wind speed of at least 0.1 m/sec. in a distance within 1 cm from the surface. Further, if apertures of the air-suction surface are too large, the fiber itself will be withdrawn into the interior of the mesh and will hardly be peeled, or smoothness is likely to be lost. Accordingly, apertures of the mesh are preferably at most 2 mm, more preferably at most 0.15 mm, further preferably at most 0.06 mm, particularly preferably at most 0.03 mm.

In a case where the film substrate having air-suction ability has flexibility, it may be used as a conveyor for collection having an air-suction function, by placing it on a conveyor capable of rotating it continuously. For example, a method will be possible wherein a film substrate wound up into a roll is continuously dispensed, and a non-woven fabric is formed on one side thereof, then separated and wound up, whereby the production method can be simplified.

The bulk density of the obtainable non-woven fabric is influenced by the hardness or thermal property of the resin to be used. By a melt blown method, it is usually possible to obtain a non-woven fabric having some of intersecting points of the fiber fused, by employing a resin having a low viscosity. Further, in some cases, such fusion may not take place and a cotton-like precursor for a non-woven fabric may be obtained, which may be collected by a conveyor for collection having an air-suction function and subjected to press bonding as it is to obtain a non-woven fabric having a prescribed bulk density.

In the above-mentioned method for forming a non-woven fabric, if intersecting points of the fiber are not fixed, handling for an operation such as winding, tends to be difficult. When at least some of intersecting points of the fiber are fixed, the elastic modulus and strength as a non-woven fabric elemental substance, can be obtained. As a result, a self-sustaining property of the non-woven fabric itself will be developed, whereby the handling efficiency will be improved, and the production of an electrolyte membrane having the non-woven fabric will be easy. As a manner in which at least some of intersecting points of the fiber are fixed, there may be mentioned, as described above, (1) a case where the fiber is fused by the time when a non-woven fabric is formed by collection of continuous fiber, (2) a case where the fiber is fused by hot pressing a non-woven fabric, and further (3) a case where intersecting points of fiber are bonded by coating a non-woven fabric with a solution containing a binder made of a solvent-soluble fluoropolymer.

The hot pressing in the above case (2) is carried out preferably within a temperature range wherein the fiber will not undergo melt deformation but has a fusion-bonding property. Although it depends on the thermal properties of the fluororesin constituting the fiber in the case of a crystalline fluororesin, the hot pressing is preferably carried out within a temperature range of from 50° C. below the melting point to the melting point, more preferably within a temperature range of from 20° C. below the melting point to the melting point. In the case of a non-crystalline fluororesin, it is preferably carried out within a temperature range of from 50° C. below the glass transition temperature to the glass transition temperature, more preferably within a temperature range of from 20° C. below the glass transition temperature to the glass transition temperature. Further, although it depends upon the above-mentioned temperature conditions, the pressure during the hot pressing is usually within a pressure range of from 0.5 to 10 MPa, whereby fusion can be accomplished without bringing about a substantial deformation of the fiber.

In the above case (3), the solvent-soluble fluoropolymer to be used for bonding intersecting points of the fiber, is meant for a fluoropolymer which can be dissolved by a solvent and which can be present in the form of a solution at a concentration of at least 0.1% at room temperature. Here, the solution in this specification includes a liquid which is macroscopically observed as a solution although microscopically, the fluoropolymer is present as dispersed or in a swelled state.

The above-mentioned binder is made of a fluoropolymer and thus is excellent in the chemical durability in the environment wherein the fuel cell is practically used. It is preferably a polymer wherein hydrogen atoms bonded to carbon atoms of the fluoropolymer are all substituted by fluorine atoms. Further, the elastic modulus of the solvent-soluble fluoropolymer should preferably be high, since the elastic modulus and strength of the non-woven fabric bonded by the binder will thereby be improved. The fluoropolymer preferably has an elastic modulus of at least $10^5$ Pa at room temperature, and more preferably has an elastic modulus of at least $10^8$ Pa at room temperature. This means that from the viewpoint of the glass transition temperature, the glass transition temperature of the fluoropolymer is at least room temperature, and it preferably has a glass transition point of at least 40° C. which is considered to be within a range of industrial room temperature.

The following polymers (i) to (iii) may be mentioned as preferred examples of the solvent-soluble fluoropolymer constituting the binder.

(i) Fluoropolymer having ion exchange groups or their precursor groups in the molecule.

The ion exchange groups may, for example, be sulfonic groups ($-SO_3H$), or sulfonimide groups ($-SO_2NHSO_2R^f$, where $R^f$ is a perfluoroalkyl group). Further, the precursor groups for such ion exchange groups may, for example, be $-SO_2F$ groups. Particularly preferred is a fluoropolymer having ion exchange groups, since it becomes an electrolyte, will not lower the open area ratio of the non-woven fabric and will not bring about an increase in the electric resistance of the electrolyte membrane. The fluoropolymer having ion exchange groups may be the same as or different from the ion exchange resin constituting the electrolyte membrane.

As an example of a fluorocarbon polymer having ion exchange groups or their precursor groups in the molecule and having an aliphatic structure in the main chain, preferred is a copolymer comprising repeating units based on a perfluoro compound represented by $CF_2=CF-(OCF_2CFX)_m-O_p-(CF_2)_n-SO_2F$ (wherein X is a fluorine atom or a trifluoromethyl group, m is an integer of from 0 to 3, n is an integer of from 0 to 12, and p is 0 or 1, provided that when n=0, p=0 and m=1 to 3), or a polymer obtainable by subjecting such a copolymer to hydrolysis and treatment to an acid form, wherein $-SO_2F$ groups are converted to $-SO_3H$ groups. Among them, a fluoropolymer having $-SO_2F$ groups is known to be soluble in a substitute flon solvent such as ASAHIKLIN AK-225 (manufactured by Asahi Glass Company, Ltd.), and a fluoropolymer having $-SO_3H$ groups is commonly known to be soluble in ethanol.

(ii) Fluoropolymer having substantially no ion exchange groups and having an alicyclic structure in the main chain.

Such a fluoropolymer is hardly crystallizable due to twisting of the molecule attributable to its molecular structure and soluble in a fluorocarbon solvent. As examples of the fluoropolymer having an alicyclic structure in the main chain, polymers containing repeating units represented by any one of the following formulae (a), (b) and (c) may be mentioned. Such polymers are soluble, for example, in e.g. perfluorobenzene, trifluoroethane, perfluoro(2-butyltetrahydrofuran) or Fluorinert FC-77 (manufactured 3M Company).

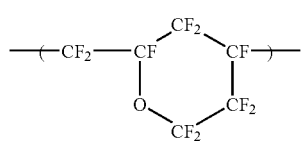
(a)

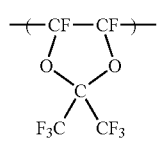
(b)

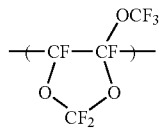
(c)

(iii) Fluoroolefin type fluoropolymer having substantially no ion exchange groups.

Such a fluoropolymer may, for example, be a tetrafluoroethylene/hexafluoropropylene/vinylidene fluoride copolymer, or a copolymer comprising repeating units based on at least one type of fluoroolefin monomers selected from the group consisting of tetrafluoroethylene, hexafluoropropylene, vinylidene fluoride and chlorotrifluoroethylene, and repeating units based on at least one type of monomers selected from the group consisting of a vinyl ether, a vinyl ester, an allyl ether, an allyl ester, an isopropenyl ether, an isopropenyl ester, a methacryl ether, a methacryl ester, an acrylate and a methacrylate.

Such fluoropolymers are soluble in ketones, esters, chloroethanes, benzene derivatives, etc.

The solvent for the solution containing the binder is preferably dried and solidified on the air-suction surface and thus preferably contains one having a boiling point of at most 150° C., more preferably one having a boiling point of at least 100° C. To ensure early bonding of intersecting points of the fiber for a non-woven fabric, the solvent having the above boiling point is contained in an amount of at least 75%, more preferably at least 95%, further preferably at least 98%, based on the total mass of the total solvent.

The solution containing a binder is preferably applied by a spray coating method. By a spray coating method, the solution containing a binder is made in a spray state, and a non-woven fabric is passed through the sprayed state of the solution containing a binder, as it is sucked on the air-suction surface, whereby the binder can be applied selectively to the fiber without clogging the apertures of the non-woven fabric.

The spray coating method is a coating method characterized in that from a small clearance, a carrier gas and the solution to be applied are simultaneously sprayed, and the sprayed state is influenced by the viscosity of the solution to be applied. In a spray system of an air spray type which is commonly used, it is known that the solution will be formed into fine droplets by a shearing stress exerted from the air at the forward end of the spray nozzle, whereby the lower the viscosity of the solution, the finer the obtainable droplets. Further, also in an airless spray system wherein a spray medium such as an air is not employed, refining is carried out by a shearing stress due to spraying of the solution itself at the forward end of the nozzle, whereby the lower the viscosity, the better. If the droplets are large, the binder tends to clog the apertures of the non-woven fabric. Therefore, the viscosity of the solution containing the binder is preferably at most 10 Pa·s, more preferably at most 1 Pa·s, particularly preferably at most 0.1 Pa·s.

In the present invention, the ion exchange resin as the main component of the electrolyte membrane may be a cation exchange resin, and a cation exchange resin made of a hydrocarbon polymer or a partially fluorinated hydrocarbon polymer, may, for example, be used. In a case where it is used for a fuel cell, a cation exchange resin made of a sulfonic perfluorocarbon polymer excellent in durability, is preferred. The ion exchange resin in the electrolyte membrane may be composed of a single ion exchange resin or may be one having two or more ion exchange resins mixed.

As the sulfonic perfluorocarbon polymer, a conventional polymer may widely be used. For example, a sulfonic perfluorocarbon polymer may be obtained by subjecting a precursor made of a resin having $SO_2F$ terminals to hydrolysis and treatment to an acid form. Here, in this specification, the perfluorocarbon polymer may contain e.g. an etheric oxygen atom.

The precursor made of a resin having $SO_2F$ terminals, is preferably a copolymer comprising monomer units based on a perfluoro compound represented by $CF_2=CF-(OCF_2CFX)_m-O_p-(CF_2)_n-SO_2F$ (wherein X is a fluorine atom or a trifluoromethyl group, m is an integer of from 0 to 3, n is an integer of from 0 to 12, and p is 0 or 1, provided that when n=0, p=0 and m=1 to 3), and monomer units based on a perfluoroolefin such as tetrafluoroethylene or hexafluoropropylene, chlorotrifluoroethylene, or a perfluoro(alkyl vinyl ether). Particularly preferred is a copolymer comprising the monomer units based on the above perfluoro compound and monomer units based on tetrafluoroethylene.

As a preferred example of the above perfluoro compound, a compound represented by any one of the following formulae, may be mentioned. In the following formulae, q is an integer of from 1 to 8, r is an integer of from 1 to 8, s is an integer of from 1 to 8, and t is an integer of from 1 to 5.

$$CF_2=CFO(CF_2)_qSO_2F$$

$$CF_2=CFOCF_2CF(CF_3)O(CF_2)_rSO_2F$$

$$CF_2=CF(CF_2)_sSO_2F$$

$$CF_2=CF(OCF_2CF(CF_3))_tO(CF_2)_2SO_2F$$

Further, a cation exchange resin of a polymer other than the perfluorocarbon polymer may, for example, be a polymer comprising monomer units represented by the following formula (1) and monomer units represented by the following formula (2). Here, $P^1$ is a phenyltriyl group, a biphenyltriyl group, a naphthalenetriyl group, a phenanthrenetriyl group or an anthracenetriyl group, $P^2$ is a phenylene group, a biphenylene group, a naphthylene group, a phenanthrylene group or an anthrylene group, $A^1$ is a $-SO_3M^2$ group (wherein $M^2$ is a hydrogen atom or an alkali metal atom, the same applies hereinafter), a $-COOM^2$ group, or a group convertible to such a group by hydrolysis, and each of $B^1$ and $B^2$ which are independent of each other, is an oxygen atom, a sulfur atom, a sulfonyl group or an isopropylidene group. The structural isomerism of $P^1$ or $P^2$ is not particularly limited. At least one hydrogen atom in $P^1$ or $P^2$ may be substituted by a fluorine atom, a chlorine atom, a bromine atom or a $C_{1-3}$ alkyl group.

$$-P^1-B^1- \atop | \atop A^1 \qquad (1)$$

$$-P^2-B^2- \qquad (2)$$

In a case where it is used as a polymer electrolyte membrane for a fuel cell, the ion exchange resin in the present invention preferably has an ion exchange capacity of from 0.5 to 2.0 meq/g dry resin, particularly preferably from 0.7 to 1.6 meq/g dry resin. If the ion exchange capacity is too low, the electric resistance tends to be large. The other hand, if the ion exchange capacity is too high, the affinity to water tends to be too strong, and the electrolyte membrane is likely to be dissolved during the power generation.

If the thickness of the electrolyte membrane is too thick, the electric resistance of the membrane tends to be large. Further, when it is used as a polymer electrolyte membrane for a fuel cell, the thinner the better, since reverse diffusion of water formed on the cathode side readily takes place. On the other hand, if the thickness of the electrolyte membrane is too thin, it tends to be difficult to obtain mechanical strength, and a trouble such as gas leakage is likely to be brought about. Therefore, with respect to the thickness of the electrolyte membrane of the present invention, the upper limit is preferably at most 100 µm, more preferably at most 50 µm, particularly preferably at most 30 µm, and the lower limit is preferably at least 5 µm, more preferably at least 20 µm.

Further, from the viewpoint of the thickness of the above electrolyte membrane, the thickness of the non-woven fabric is preferably at most 50 µm, more preferably at most 30 µm, particularly preferably at most 20 µm. The unit weight of the non-woven fabric at that time is preferably from 5 to 50 g/m² (from 2.5 to 25 c/m²) with a view to accomplishing both the reinforcing effect and reduction of the membrane electric resistance.

A method for preparing the electrolyte membrane which is made mainly of an ion exchange resin and reinforced with a non-woven fabric may, for example, be (1) a cast method wherein a non-woven fabric is coated or impregnated with a solution or dispersion of the ion exchange resin, followed by drying to form a film, or (2) a method wherein a preliminarily formed membrane-form material of the ion exchange resin is laminated on the non-woven fabric under heating for integration. Such a composite membrane of the non-woven fabric with the ion exchange resin may be strengthened by stretch treatment or the like.

The electrolyte membrane has, as the outermost layer on one side or each side, a layer not reinforced, made of an ion exchange resin which may be the same as or different from the above-mentioned ion exchange resin reinforced by the non-woven fabric. By such a construction, it is possible to lower the electric resistance at the bonded portion of the electrolyte membrane and the electrode, when the electrolyte membrane of the present invention is used as a polymer electrolyte membrane for a polymer electrolyte fuel cell. There may be a case where the layer not reinforced, made of an ion exchange resin, is formed as the outermost layer, when a composite membrane of the non-woven fabric with the ion exchange resin is formed as described above. Otherwise, following the formation of such a composite membrane, a solution or dispersion of an ion exchange resin may be applied on the surface of such a composite membrane or a single film of an ion exchange resin may be laminated on the surface of such a composite membrane, to form the layer not reinforced, made of the ion exchange resin. It is preferred to have the layer not reinforced, as the outermost layer on each side. The layer not reinforced, made of an ion exchange resin, may contain a component other than the reinforcing material, which will not bring about an increase in the electric resistance.

The thickness of the layer not reinforced, is preferably from 1 to 20 µm per one side, since it is thereby excellent in the barrier function against a fuel gas of the fuel cell and is capable of suppressing the membrane electric resistance. It is more preferably from 2 to 15 µm, still further preferably from 2 to 10 µm. Here, in this specification, the thickness of the layer not reinforced, can be measured by observation of the cross section by e.g. an optical microscope, a laser microscope or SEM. The thickness of the layer not reinforced means the shortest distance between the surface of the electrolyte membrane and the fiber of the non-woven fabric.

When the electrolyte membrane of the present invention is used as a polymer electrolyte membrane for a polymer electrolyte fuel cell, transfer of protons will be shielded by the fiber of the non-woven fabric. If the thickness of the layer not reinforced, is too thin, the path length for the electric current to make a detour to avoid the fiber will be large, thus causing an unnecessary increase in the electric resistance. Especially when the thickness of the layer not reinforced is smaller than one half of the fiber diameter, the increase in the electric resistance tends to be remarkable. In a case where the thickness of the layer not reinforced is at least a value corresponding to the fiber radius of the continuous fiber, the detour path length of the electric current may be small, and consequently, an unnecessary increase in a electric resistance can be avoided, such being desirable.

The electrolyte membrane of the present invention may be used as a polymer electrolyte membrane for a membrane-electrode assembly for a polymer electrolyte fuel cell. The membrane-electrode assembly for a polymer electrolyte fuel cell comprises a cathode and an anode, each having a catalyst layer comprising a catalyst and an ion exchange resin, and a polymer electrolyte membrane disposed between the cathode and the anode.

In accordance with a usual method, the membrane-electrode assembly for a polymer electrolyte fuel cell can be obtained, for example, as follows. Firstly, a uniform dispersion comprising a conductive carbon black powder having fine particles of platinum catalyst or platinum alloy catalyst supported thereon and a liquid composition containing the electrolyte material, is obtained, and a gas diffusion electrode is formed by any one of the following methods, to obtain a membrane-electrode assembly.

The first method is a method wherein the above dispersion is applied to both sides of the electrolyte membrane and dried, and then two sheets of carbon paper or carbon cloth are bonded to both sides. The second method is a method wherein the above dispersion is coated on two sheets of carbon paper or carbon cloth and dried, and then, the electrolyte membrane is sandwiched from both sides by them so that the side coated with the dispersion will be bonded to the electrolyte membrane. The third method is a method wherein the above dispersion is coated on a separately prepared substrate film and dried to form a catalyst layer, and then, the catalyst layer is transferred to each side of the electrolyte membrane, and further, two sheets of carbon paper or carbon cloth are bonded to both sides. Here, the carbon paper or carbon cloth has a function as a current collector as well as a function as a gas diffusing layer to uniformly diffuse the gas by the layer containing the catalyst.

The obtained membrane-electrode assembly is sandwiched between separators having grooves formed to constitute channels for fuel gas or oxidizing gas, and hydrogen gas is supplied to the anode side of the membrane-electrode assembly, and oxygen or air is supplied to the cathode side, thereby to constitute a polymer electrolyte fuel cell.

EXAMPLES

Now, the present invention will be described in further detail with reference to Examples and Comparative Examples, but it should be understood that the present invention is by no means thereby restricted.

Example 1

Using an apparatus for producing a melt blow non-woven fabric (manufactured by NIPPON NOZZLE CO., LTD.) and using PFA (tradename: Fluon PFA P-61XP, manufactured by Asahi Glass Company, Limited, MFR=40 g/10 min.), a non-woven fabric is formed on a conveyor having a sucking ability under such conditions that the die temperature is 330° C. and the hot air temperature for stretching is 360° C. The fluororesin constituting the non-woven fabric is continuous fiber, and its aspect ratio is at least 10,000. An area of 2.6 cm×2.6 cm of the non-woven fabric is observed by a microscope, whereby one having a fiber length of not more than 13 mm, is not observed. Then, this non-woven fabric is densified by hot pressing (290° C., 10 MPa). The fiber diameter of the spun fiber is 10 µm, the thickness of the non-woven fabric is 20 µm, and the unit weight of the non-woven fabric is 10 g/m² (5 cc/m²).

Then, in such a state that the edge of the non-woven fabric is constrained, it is dipped in a solution (solid content concentration: 5 mass %) of an ion exchange resin made of a copolymer of $CF_2=CF_2$ with $CF_2=CF-OC_2FCF(CF_3)-OCF_2CF_2SO_3H$ having an ion exchange capacity of 1.1 meq/g dry resin (hereinafter referred to as ion exchange resin (A)) in ethanol as a solvent and withdrawn at a rate of 100 mm per minute to impregnate the above ion exchange resin (A) into the non-woven fabric. This dipping/withdrawing operation is repeated three times, followed by drying at 55° C. for one hour in the constrained state to obtain a composite membrane.

On the other hand, a solution of the above ion exchange resin (A) in ethanol as a solvent, is applied on a PET film by die coating and dried at 140° C. for one hour to obtain a single film 1 made of the above ion exchange resin (A) and having a thickness of 10 µm.

The above single film 1 is disposed on each side of the above composite membrane and subjected to a hot pressing method (160° C., 5 Pa, 15 minutes) to obtain an electrolyte membrane. With respect to the electrolyte membrane, evaluation is carried out by the following methods, and the results obtained are shown in Table 1. Further, from the observation of the cross section by a laser microscope, the thickness of the layer not reinforced is 10 µm.

Measurement of Tear Strength

Firstly, from the electrolyte membrane, a sample for measuring the strength having a square shape of 100 mm in width and 100 mm in length, is cut out. A cut line of 50 mm is imparted by a knife from one end of the sample to the center portion of the membrane. Then, so that the forward end of the cutting line will be torn, the respective end portions are separated upwardly and downwardly and pinched by upper and lower chuckings of a tensile tester and torn at a rate of 500 mm per minute. A value obtained by dividing the force required for tearing by the thickness of the electrolyte membrane, is measured with respect to both the longitudinal and transverse directions of the membrane, and the average value is obtained and taken as the tear strength.

Measurement of Dimensional Change Upon Absorption of Water

The electrolyte membrane is cut out in a square of 200 mm×200 mm and exposed to an atmosphere at a temperature of 25° C. under a humidity of 50% for 16 hours, whereupon the longitudinal and transverse lengths of the sample are measured. Then, the sample is dipped in deionized water of 25° C. for one hour, whereupon the longitudinal and transverse lengths are measured in the same manner. The average value of the elongation in the longitudinal direction and the elongation in the transverse direction of the sample is obtained and taken as the dimensional change.

Preparation and Evaluation of Fuel Cell

A fuel cell is assembled as follows. Firstly, the ion exchange resin (A) is put into a mixed solvent of ethanol and water (1:1 by mass ratio) and dissolved with stirring at 60° C. for 16 hours in a flask having a refluxing function, to obtain a polymer solution having a solid content of 9%. Then, to platinum-supported carbon, water and ethanol are sequentially added in this order to obtain a catalyst dispersion (solid content: 9 mass %) dispersed in a mixed dispersant of ethanol and water (1:1 by mass ratio). Then, the polymer solution and the catalyst dispersion are mixed in a mass ratio of 11:3 to obtain a coating solution. Then, this coating solution is applied on each side of the electrolyte membrane by a die coating method and dried to form a catalyst layer having a thickness of 10 μm and having platinum supported in an amount of 0.5 mg/cm$^2$, on each side of the membrane. Further, on outside of each side, carbon cloth is disposed as a gas diffusion layer to obtain a membrane-electrode assembly. On the outside of each side of this membrane-electrode assembly, a separator made of a carbon plate having narrow grooves formed in a zig-zag pattern for gas channels is disposed and on outside thereof a heater is disposed, whereby a polymer electrolyte fuel cell having an effective membrane area of 25 cm$^2$ is assembled.

While the temperature of the fuel cell is maintained at 80° C., air is supplied to the cathode, and hydrogen is supplied to the anode, under 0.15 MPa, respectively. The cell voltages when the current density is 0.1 A/cm$^2$ and 1 A/cm$^2$, are respectively measured. The results are as shown in Table 1.

Example 2

Using the apparatus for producing a melt blown non-woven fabric and using the same PFA as in Example 1, a non-woven fabric is formed on a conveyor having a sucking ability under such conditions that the die temperature is 350° C., and the hot air temperature for stretching is 380° C. Then, this non-woven fabric is densified by hot pressing (290° C., 10 MPa). The fiber diameter of the spun fiber is 5 μm, the thickness of the non-woven fabric is 20 μm, and the unit weight of the non-woven fabric is 10 g/m$^2$ (5 cc/m$^2$). Then, an electrolyte membrane is prepared in the same manner as in Example 1, and the same evaluation is carried out. The obtained results are shown in Table 1.

Example 3

Using the apparatus for producing a melt blow non-woven fabric and using the same PFA as in Example 1, a non-woven fabric is formed on a conveyor having a sucking ability under such conditions that the die temperature is 380° C., and the hot air temperature for stretching is 400° C. Then, this non-woven fabric is densified by hot pressing (290° C., 10 MPa). The fiber diameter of the spun fiber is 0.5 μm, the thickness of the non-woven fabric is 20 μm, and the unit weight of the non-woven fabric is 10 g/m$^2$ (5 cc/m$^2$). Then, in the same manner as in Example 1, an electrolyte membrane is prepared, and the same evaluation is carried out. The obtained results are shown in Table 1.

Example 4

Using the apparatus for producing a melt blown non-woven fabric and using the same PFA as in Example 1, a non-woven fabric is formed on a conveyor having a sucking ability under such conditions that the die temperature is 330° C., and the hot air temperature for stretching is 360° C. Then, this non-woven fabric is densified by hot pressing (290° C., 10 MPa). The fiber diameter of the spun fiber is 0.5 μm, the thickness of the non-woven fabric is 200 μm, and the unit weight of the non-woven fabric is 100 g/m$^2$ (50 cc/m$^2$).

In the same manner as in Example 1, one having the above ion exchange resin (A) impregnated into this non-woven fabric, is biaxially stretched ten times by an area ratio to prepare a composite membrane having a fiber diameter of 0.05 μm, a thickness of 20 μm and a unit weight of the non-woven fabric of 10 g/m$^2$ (5 cc/m$^2$). Then, in the same manner as in Example 1, an electrolyte membrane is prepared, and the same evaluation is carried out. The obtained results are shown in Table 1.

Example 5

Using the apparatus for producing a melt blown non-woven fabric and using the same PFA as in Example 1, a non-woven fabric is formed on a conveyor having a sucking ability under such conditions that the die temperature is 330° C., and the hot air temperature for stretching is 330° C. Then, this non-woven fabric is densified by hot pressing (302° C., 5 MPa). The fiber diameter of the spun fiber is 15 μm, the thickness of the non-woven fabric is 20 μm, and the unit weight of the non-woven fabric is 10 g/m$^2$ (5 cc/m$^2$). Then, in the same manner as in Example 1, an electrolyte membrane is prepared, and the same evaluation is carried out. The obtained results are shown in Table 1.

Example 6

Using the apparatus for producing a melt blown non-woven fabric and using the same PFA as in Example 1, a non-woven fabric is formed on a conveyor having a sucking ability under such conditions that the die temperature is 330° C., and the hot air temperature for stretching is 260° C. Then, this non-woven fabric is densified by hot pressing (302° C., 5 MPa). The fiber diameter of the spun fiber is 10 μm, the thickness of the non-woven fabric is 20 μm, and the unit weight of the non-woven fabric is 10 g/m$^2$ (5 cc/m$^2$). Then, an electrolyte membrane is prepared in the same manner as in Example 1 except that a single film 2 made of the ion exchange resin (A) and having a thickness of 5 μm is used. The same evaluation is carried out, and the obtained results are shown in Table 1.

Example 7

Using the apparatus for producing a melt blow non-woven fabric and using the same PFA as in Example 1, a non-woven fabric is formed on a conveyor having a sucking ability under such conditions that the die temperature is 330° C., and the hot air temperature for stretching is 260° C. Then, this non-woven fabric is densified by hot pressing (302° C., 5 MPa). The fiber diameter of the spun fiber is 10 μm, the thickness of the non-woven fabric is 20 μm, and the unit weight of the non-woven fabric is 10 g/m$^2$ (5 cc/m$^2$).

On the other hand, a solution of the above ion exchange resin (A) in ethanol as a solvent is applied on a PEF film by die coating and dried at 140° C. for one hour to obtain a single film 3 made of the above ion exchange resin (A) and having a thickness of 15 μm.

On each side of the above non-woven fabric, the above single film 3 is disposed and subjected to a hot pressing method (165° C., 5 MPa, 5 minutes) to obtain an electrolyte membrane. The same evaluation is carried out, and the obtained results are shown in Table 1.

Comparative Example 1

A die for monofilament is attached to a general-purpose extruder, and using a general-purpose fiber-withdrawing machine, the same PFA as in Example 1 is melt-molded at a die temperature of 380° C. to obtain PFA fiber (cross sectional diameter: 15 μm). This PFA fiber is cut by scissors into a fiber length of 1 mm and mixed with a solution (solid content concentration: 9 mass %) of the ion exchange resin (A) in ethanol as a solvent to obtain a solution having short fibers dispersed. Then, this solution is applied on a substrate so that the dried thickness will be 20 μm, and dried to obtain a composite membrane. Then, in the same manner as in Example 1, an electrolyte membrane is prepared, and the same evaluation is carried out. The obtained results are shown in Table 2.

Comparative Example 2

In the same manner as in Example 1, a composite membrane is prepared, and without laminating a layer not reinforced thereon, an electrolyte membrane is prepared. The same evaluation is carried out, and the obtained results are shown in Table 2.

Comparative Example 3

A solution of the above ion exchange resin (A) in ethanol as a solvent, is applied on a PET film by die coating and dried at 140° C. for one hour to obtain a single film 4 made of the above ion exchange resin and having a thickness of 50 μm. The same evaluation is carried out, and the obtained results are shown in Table 2.

In the following Examples 8 to 10 and Comparative Example 4, the physical properties of the binder and the physical properties of the non-woven fabric were measured as follows.

Elastic Modulus of Binder, Glass Transition Temperature

A solvent-soluble fluoropolymer constituting a binder was subjected to hot pressing (temperature: 200° C., pressure: 5 MPa) to prepare a film test specimen having a thickness of about 200 μm. Then, from this film specimen, a sample of 5 mm×35 mm was cut out, and using a general-purpose dynamic viscoelasticity measuring apparatus DVA-200 (manufactured by ITK Co., Ltd.), the measurement was carried out in a tensile mode at a frequency of 1 Hz and at a scanning temperature of 2° C./min. to measure the complex elastic modulus from −50° C. to 150° C. The value of complex elastic modulus at 25° C. was obtained. Further, the temperature at which the loss modulus became maximum between the temperature range where the complex elastic modulus exceeded $10^8$ Pa and the range where it decreased to $10^7$ Pa due to the temperature rise, was taken as the glass transition temperature (Tg).

Unit Weight of Non-Woven Fabric, Open Area Ratio and Fiber Diameter of Non-Woven Fabric A PET film coated with an adhesive is pressed against a non-woven fabric to have the non-woven fabric transferred, whereupon the unit weight of the non-woven fabric of the non-woven fabric was measured from the transferred area and the weight increase. Further, from the microscopic photograph of the cross section, the thickness of the non-woven fabric and the fiber diameter were measured. The open area ratio was calculated by the following formula.

Open area ratio (%)=100−$A$×100/($B$×$C$)

A: The unit weight of the non-woven fabric (g/m$^2$) of the portion made of the material which is not an electrolyte, among the materials constituting the non-woven fabric B: The density (g/m$^3$) of the material which is not an electrolyte, among the materials constituting the non-woven fabric C: Thickness (m) of the non-woven fabric

TABLE 1

|  | Ex. 1 | Ex. 2 | Ex. 3 | Ex. 4 | Ex. 5 | Ex. 6 | Ex. 7 |
|---|---|---|---|---|---|---|---|
| Fiber form | Continuous | Continuous | Continuous | Continuous | Continuous | Continuous | Continuous |
| Fiber diameter (μm) | 10 | 5 | 0.5 | 0.05 | 15 | 10 | 10 |
| Thickness of non-woven fabric (μm) | 20 | 20 | 20 | 20 | 20 | 20 | 20 |
| Thickness of layer not reinforced (μm) | 10 | 10 | 10 | 10 | 10 | 5 | 5 |
| Tear strength (N/mm) | 6 | 6 | 5 | 5 | 3.5 | 6 | 6 |
| Dimensional change (%) | 3.8 | 3.2 | 2.5 | 2 | 4.8 | 3.2 | 3.2 |
| Cell voltage at 0.1 A/cm$^2$ (V) | 0.75 | 0.76 | 0.77 | 0.77 | 0.75 | 0.75 | 0.75 |
| Cell voltage at 1 A/cm$^2$ (V) | 0.55 | 0.58 | 0.60 | 0.62 | 0.53 | 0.53 | 0.53 |

TABLE 2

|  | Comp. Ex. 1 | Comp. Ex. 2 | Comp. Ex. 3 |
|---|---|---|---|
| Fiber form | Short fiber | Continuous | — |
| Fiber diameter (μm) | 15 | 10 | — |
| Thickness of non-woven fabric (μm) | 20 | 20 | — |
| Thickness of layer not reinforced (μm) | 10 | 0 | 50 |
| Tear strength (N/mm) | 3 | 6 | 0.5 |
| Dimensional change (%) | 6 | 3 | 15 |
| Cell voltage at 0.1 A/cm$^2$ (V) | 0.73 | 0.63 | 0.72 |
| Cell voltage at 1 A/cm$^2$ (V) | 0.51 | <0.4 | 0.64 |

Tensile Strength of Non-Woven Fabric

Within one hour from the formation, the bonded non-woven fabric was cut into a sample having a width of 10 mm and a length of 70 mm, and a tensile test was carried out at a tensile speed of 50 mm/min. with a distance between chucks being 50 mm to measure the tensile strength.

Example 8

Using the apparatus for producing a melt blown non-woven fabric and using the same PFA as in Example 1, a non-woven fabric was formed on a conveyor for collection having a sucking ability under such conditions that the die temperature was 390° C. and the hot air temperature for stretching was 480° C. The conveyor for collection had a strip shaped SUS type mesh having apertures of 1 mm and had a wind speed of 1 m/sec. within 1 cm from the mesh surface. With respect to this non-woven fabric before fixing intersecting points of the fiber; the open area ratio was measured and found to be 70%.

Then, as a solution containing a binder, a solution obtained by diluting a solution of CYTOP (tradename: CTL-109S, manufactured by Asahi Glass Company, Limited) with Fluorinert FC-77 (manufactured by 3M Company, boiling point: 100° C.) to have a concentration of 0.5% and a viscosity of 0.003 Pa·s (25° C.), was prepared. Using a commercially available handy type sprayer, the solution was sprayed a few times to the non-woven fabric and left to stand for one minute to dry the solvent in air. Then, suction of the conveyor was stopped, and the non-woven fabric formed on the mesh was peeled to obtain a self-sustaining non-woven fabric. The physical properties of the non-woven fabric having thus intersecting points of the fiber fixed, were evaluated, and the results are shown in Table 3.

In such a state that the edge of the non-woven fabric was held by means of a four sides-restraining frame made of PTFE, the non-woven fabric was dipped in a solution (solid content concentration: 5 mass %) of the ion exchange resin (A) in ethanol as a solvent and withdrawn at a rate of 100 mm per minute to impregnate the above ion exchange resin (A) into the non-woven fabric. This dipping/withdrawing operation was repeated three times and then dried at 55° C. for one hour in the constrained state to obtain a composite membrane.

On each side of the composite membrane, the single film 2 having a thickness of 5 μm, as used in Example 6, was disposed and subjected to hot pressing (160° C., 5 Pa, 15 minutes) to obtain an electrolyte membrane.

Preparation and Evaluation of Fuel Cell

The ion exchange resin (A) was put into a mixed solvent of ethanol and water (1:1 by mass ratio) and dissolved with stirring at 60° C. for 16 hours in a flask having a refluxing function, to obtain a polymer solution having a solid content of 9%. Then, water and ethanol are sequentially added in this order to platinum-supported carbon to obtain a catalyst dispersion (solid content: 9 mass %) dispersed in a mixed dispersant of ethanol and water (1:1 by mass ratio). Then, the polymer solution and the catalyst dispersion were mixed in a mass ratio of 11:3 to prepare a coating solution. Then, this coating solution was applied to each side of the electrolyte membrane by a die coating method and dried to form a catalyst layer having a thickness of 10 μm and having platinum supported in an amount of 0.5 mg/cm² on each side of the membrane. Further, on outside of each side, carbon cloth was disposed as a gas diffusion layer to obtain a membrane-electrode assembly. On each side of this membrane-electrode assembly, a separator made of a carbon plate having narrow grooves formed in a zig-zag pattern for gas channels was disposed, and further, on outside thereof, a heater was disposed, whereby a polymer electrolyte fuel cell having an effective membrane area of 25 cm² was assembled.

While the temperature of the fuel cell was maintained at 80° C., air was supplied to the cathode, and hydrogen was supplied to anode, under 0.15 MPa, respectively, whereby the cell voltages when the current density was 0.1 A/cm² and 1 A/cm², were measured, respectively. The results are shown in Table 3.

Example 9

A non-woven fabric was prepared in the same manner as in Example 8 except that in Example 8, as a solution containing a binder, a solution obtained by dissolving a copolymer of $CF_2=CF_2$ with $CF_2=CF-OC_2FCF(CF_3)-OCF_2CF_2SO_2F$ (ion exchange capacity when converted to a $-SO_3H$ type: 1.1 meq/g dry resin) in ASAHKLIN AK-225 (manufactured by Asahi Glass Company, Limited, boiling point: 58° C.) by heating at 58° C. for 16 hours and having a solid content of 0.5% and a viscosity of 0.01 Pa·s, (25° C.), was used. The same evaluation as in Example 8 was carried out, and the results are shown in Table 3.

Further, in the same manner as in Example 8, an electrolyte membrane and a fuel cell were prepared, and the cell voltages were measured. The results are shown in Table 3.

Example 10

A non-woven fabric was prepared in the same manner as in Example 8 except that in Example 8, as a solution containing a binder, a solution obtained by diluting a solution of a copolymer of $CF_2=CF_2$ with $CF_2=CF-OC_2FCF(CF_3)-OCF_2CF_2SO_3H$ (product name: FSS-1, manufactured by Asahi Glass Company, Limited) with ethanol (boiling point: 78° C.) to have a concentration of 0.5% and a viscosity of 0.01 Pa·s (25° C.), was used. The same evaluation as in Example 8 was carried out, and the results are shown in Table 3.

Further, in the same manner as in Example 8, an electrolyte membrane and a fuel cell were prepared, and the cell voltages were measured, and the results are shown in Table 3.

Comparative Example 4

In the same manner as in Example 8, a non-woven fabric was formed on a conveyor for collection, and without fixing intersecting points of the fiber, suction was stopped, and handling was attempted, but loosening of the fiber partly resulted, and a stable self-sustaining product was not obtained. The tensile test was carried out in the same manner as in Example 8, whereby the strength was less than 10 N/m.

TABLE 3

|  |  | Ex. 8 | Ex. 9 | Ex. 10 | Comp. Ex. 4 |
|---|---|---|---|---|---|
| Binder | Complex elastic modulus (Pa) | $1 \times 10^9$ | $6 \times 10^6$ | $3 \times 10^8$ | — |
|  | Tg (° C.) | 108 | 0 | 78 | — |
|  | Viscosity of solution (Pa · s) | 0.003 | 0.01 | 0.01 | — |
| Non-woven fabric | Fiber diameter (μm) | 10 | 10 | 10 | 10 |
|  | Unit weight of non-woven fabric (g/m²) | 10 | 10 | 10 | 10 |
|  | Thickness | 16.6 | 16.6 | 16.6 | 16.6 |

TABLE 3-continued

|  |  | Ex. 8 | Ex. 9 | Ex. 10 | Comp. Ex. 4 |
|---|---|---|---|---|---|
|  | (μm) |  |  |  |  |
|  | Open area ratio (before fixing) (%) | 70.0 | 70.0 | 70.0 | 70.0 |
|  | Open are ratio (after fixing) (%) | 69.5 | 69.5 | 70.0 | — |
|  | Tensile strength (N/m) | 120 | 120 | 120 | <10 |
| Evaluation of cell | Cell voltage at 0.1 A/cm² (V) | 0.82-0.86 | 0.82-0.86 | 0.82-0.86 | — |
|  | Cell voltage at 1 A/cm² (V) | 0.55-0.65 | 0.55-0.65 | 0.55-0.65 | — |

According to the present invention, a non-woven fabric to be used for reinforcing can be produced efficiently, and it is possible to obtain an electrolyte membrane having high mechanical strength even when the thickness is thin, being excellent in the dimensional stability upon absorption of water and having a low electric resistance. And, a membrane-electrode assembly obtained by using this electrolyte membrane, is excellent in handling efficiency and stability, and it is possible to obtain a polymer electrolyte fuel cell having high durability performance.

The entire disclosures of Japanese Patent Application No. 2004-371367 filed on Dec. 22, 2004 and Japanese Patent Application No. 2005-170890 filed on Jun. 10, 2005 including specifications, claims, drawings and summaries are incorporated herein by reference in their entireties.

What is claimed is:

1. An electrolyte membrane comprising:
a reinforced inner layer; and
an unreinforced outer layer on one or each side of the reinforced inner layer,
wherein the reinforced inner layer comprises an inner ion exchange resin reinforced with a non-woven fabric comprising a melt moldable fluororesin in the form of a continuous fiber having a fiber length of at least 20 mm,
wherein the continuous fiber comprises intersecting points that are fused and/or bonded,
the unreinforced outer layer has a thickness corresponding to at least a radius of the continuous fiber, and
wherein the unreinforced outer layer comprises an outer ion exchange resin, which may be the same as or different from the inner ion exchange resin.

2. The electrolyte membrane according to claim 1, wherein the melt moldable fluororesin is a homopolymer, a copolymer or a polymer blend comprising one or more monomers selected from the group consisting of tetrafluoroethylene, hexafluoropropylene, chlorotrifluoroethylene, and perfluoro (alkyl vinyl ether).

3. The electrolyte membrane according to claim 1, wherein the melt moldable fluororesin is one or more fluororesins selected from the group consisting of a tetrafluoroethylene/perfluoro(alkyl vinyl ether) copolymer (PFA), an ethylene/tetrafluoroethylene copolymer (ETFE), a tetrafluoroethylene/hexafluoropropylene copolymer (FEP), an ethylene/chlorotrifluoroethylene copolymer (ECTFE), a polychlorotrifluoroethylene (PCTFE), a polyvinylidene fluoride (PVDF) and a polyvinyl fluoride polymer (PVF).

4. The electrolyte membrane according to claim 1, wherein the melt moldable fluororesin is a tetrafluoroethylene/perfluoro(alkyl vinyl ether) copolymer (PFA).

5. The electrolyte membrane according to claim 1, wherein the melt moldable fluororesin is an ethylene/tetrafluoroethylene copolymer (ETFE) having a molar ratio of tetrafluoroethylene to ethylene of 70-30/30-70.

6. The electrolyte membrane according to claim 1, wherein the melt moldable fluororesin has a melt flow rate of 40-300 g/10 min as measured in accordance with ASTM D3307.

7. The electrolyte membrane according to claim 1, wherein a surface of the continuous fiber has a polar group selected from the group consisting of a —COOH group, a —OH group and a —COF group.

8. The electrolyte membrane according to claim 1, wherein the continuous fiber has a fiber diameter of 0.01-13 μm.

9. The electrolyte membrane according to claim 1, wherein the continuous fiber has an aspect ratio of at least 10,000.

10. The electrolyte membrane according to claim 1, wherein the intersecting points of the continuous fiber are fused.

11. The electrolyte membrane according to claim 1, wherein the intersecting points of the continuous fiber are bonded.

12. The electrolyte membrane according to claim 1, wherein the intersecting points of the continuous fiber are fused and bonded.

13. The electrolyte membrane according to claim 1, wherein the intersecting points of the continuous fiber are bonded by a binder comprising a solvent-soluble fluoropolymer.

14. The electrolyte membrane according to claim 13, wherein the solvent-soluble fluoropolymer comprises an alicyclic repeat unit of the formula (a), (b) or (c):

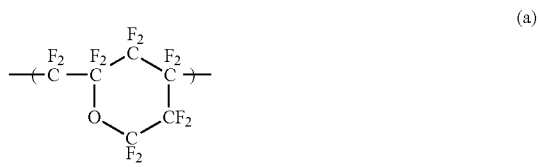

15. The electrolyte membrane according to claim 13, wherein the solvent-soluble fluoropolymer has an elastic modulus of at least $10^5$ Pa at room temperature.

16. The electrolyte membrane according to claim 13, wherein the solvent-soluble fluoropolymer has an ion exchange group or a precursor thereof.

17. The electrolyte membrane according to claim 16, wherein the ion exchange group or the precursor thereof is selected from the group consisting of:
a —SO₃H group;
a —SO₂F group;

a $CF_2=CF-(OCF_2CFX)_m-O_p-(CF_2)_n-SO_3H$ group, wherein X is a fluorine atom or a trifluoromethyl group, m is an integer of from 0 to 3, n is an integer of from 0 to 12, and p is 0 or 1, with the proviso that when n=0, p=0 and m is an integer of from 1 to 3;

a $CF_2=CF-(OCF_2CFX)_m-O_p-(CF_2)_n-SO_2F$ group, wherein X is a fluorine atom or a trifluoromethyl group, m is an integer of from 0 to 3, n is an integer of from 0 to 12, and p is 0 or 1, with the proviso that when n=0, p=0 and m is an integer of from 1 to 3; and a $-SO_2NHSO_2R^f$ group, wherein $R^f$ is a perfluoroalkyl group.

18. The electrolyte membrane according to claim 1, wherein the outer ion exchange resin is the same as the inner ion exchange resin.

19. The electrolyte membrane according to claim 1, wherein the outer ion exchange resin is different from the inner ion exchange resin.

20. The electrolyte membrane according to claim 1, wherein the unreinforced outer layer has a thickness of 1-20 μm.

21. The electrolyte membrane according to claim 1, wherein the non-woven fabric has a density of 5-50 g/m² and a thickness of at most 50 μm.

22. The electrolyte membrane according to claim 1, wherein the electrolyte membrane has a thickness of at most 100 μm.

23. The electrolyte membrane according to claim 1, wherein the unreinforced outer layer has a thickness of from 2 to 10 μm.

24. The electrolyte membrane according to claim 1, wherein the continuous fiber has a fiber diameter of from 0.01 to 3 μm.

25. A membrane electrode assembly for a polymer electrolyte fuel cell, wherein the membrane electrode assembly comprises a cathode and an anode, each having a catalyst layer comprising a catalyst and an ion exchange resin, and a polymer electrolyte membrane interposed between the cathode and the anode, wherein the polymer electrolyte membrane comprises the electrolyte membrane according to claim 1.

* * * * *